L. WIRTZ.
MEANS FOR PURIFYING AND VAPORIZING OILS.
APPLICATION FILED MAY 19, 1919.
1,403,279.                                    Patented Jan. 10, 1922.
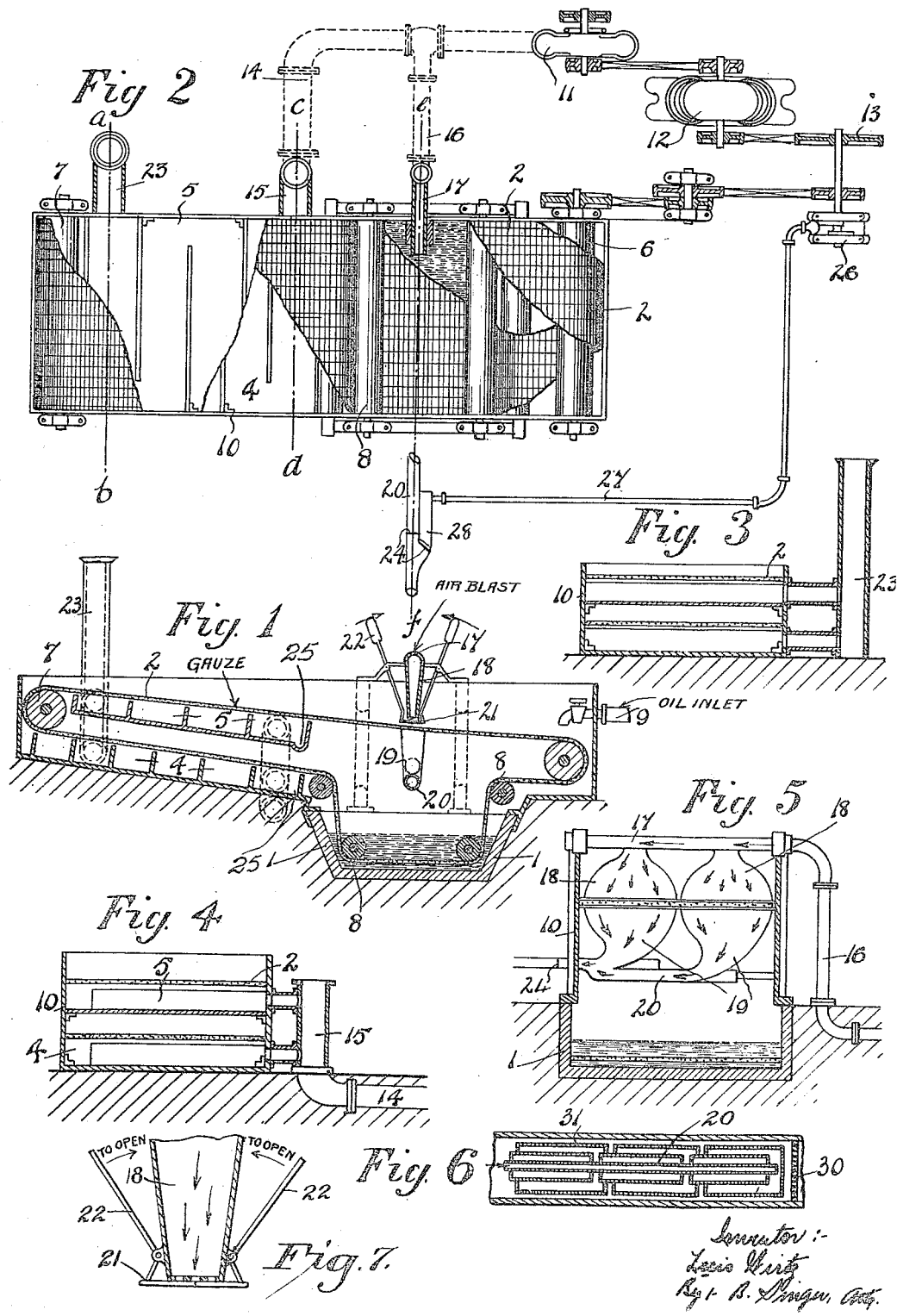

UNITED STATES PATENT OFFICE.

LUIS WIRTZ, OF STREATHAM, LONDON, ENGLAND.

MEANS FOR PURIFYING AND VAPORIZING OILS.

1,403,279.        Specification of Letters Patent.    Patented Jan. 10, 1922.

Application filed May 19, 1919. Serial No. 298,206.

(GRANTED UNDER THE PROVISIONS OF THE ACT OF MARCH 3, 1921, 41 STAT. L., 1313.)

*To all whom it may concern:*

Be it known that I, LUIS WIRTZ, subject of the King of Great Britain, residing at 19 Stanthorpe Road, Streatham, London, S. W., England, engineer, have invented certain new and useful Improvements in Means for Purifying and Vaporizing Oils, (for which I have filed an application in England April 4, 1918, Patent No. 124,895,) of which the following is a specification.

The object of my invention is to provide means whereby crude and more or less impure oily substances, which are suitable for vaporizing for the purpose of burning or exploding, may be separated from water or extraneous matter, more readily atomized, and completely mixed with air, previous to utilizing them in furnaces, internal combustion engines, and the like.

The invention is hereinafter described more particularly as applied to separating on a large scale, a crude heavy oil mixed with water (that cannot be separated by gravity alone), and also finely dividing the separated oil and mixing it with air, to carburize the air preparatory to using the mixture under a set of furnaces or boilers.

A feature of the invention is the separation of the oil from water or the like by means of a traveling gauze, or open work, fabric which dips into the oil and by the action of gravity on the oil to cling to the fabric, a separation or purification is effected during the substantially horizontal travel of the fabric. The oil film which is collected on the surfaces of the fabric may be removed therefrom by air currents.

A further feature is the arrangement of chambers traversed by the fabric in which air currents are circulated, substantially parallel with the surfaces of the traveling fabric.

Another feature is the construction of the oil collector, as an atomizing chamber.

Another feature is the manner of carrying the atomized oil from the purifier or separator to the means for utilizing it.

In the drawings:—

Figure 1 is a sectional elevation of an apparatus made in accordance with my invention.

Figure 2 is a plan of Fig. 1, with parts broken away.

Figure 3 is a transverse section on line *a—b* of Fig. 2.

Figure 4 is a section on line *c—d* of Fig. 2.

Figure 5 is a section on line *e—f* of Fig. 2.

Figure 6 is a detail view of the construction of the conveying pipes.

Figure 7 is a detail view of the valve and its operating levers.

In this example which is more particularly intended for dealing with considerable supplies of oil, 9 is the oil inlet cock to the enclosure 10 in which the oil collects in a sump or tank 1. An endless belt of gauze or the like 2, driven by a motive roller or pulley 6 and guided by rollers 8, picks up oil from the sump 1 and conveys it over the separating compartments 4, and over the end roller 7 and back through a second set of separating compartments 5.

The compartments 4 and 5 have an air supply as hereinafter set forth, and the alternate walls or divisions are short of the side walls so that a laterally reversing, or serpentine, air current is provided below the belt, see Figs. 2, 3 and 4. These compartments 4 and 5 are inclined so as to facilitate the separation of the water and the like from the oil by gravity, and they are provided with gutters 25 to drain off the water. In its further travel the belt passes atomizers or collectors comprising transverse upper chambers 18 with openings at the bottom just above the belt, and an air distributing pipe 17 at the upper parts thereof, and transverse lower chambers 19 gradually tapering to pipes 20. The pipes 20 serve to carry off the oil from the belt. Gauge diaphragms 24 are arranged in the pipe for the oil to pass through to secure a further separation of it from any foreign matter.

A current of air is supplied by the fan 11, through pipes 16 and 17 to the top chambers 18 of the atomizer, and through pipes 14, 15, to the separating compartments 4 and 5 and out through the outlet 23 to the atmosphere. The passage of air through the belt 2 from the upper chamber 18 of the atomizers may be controlled by any suitable valves which shut off more or less of the holes in the bottom of the chambers, the valves being moved into or out of obturating position by the hand levers 22.

In passing the current of air across the moving belt I preferably utilize a blast of air at a moderate pressure meeting the belt at right angles on the one face while I establish a suction on the opposite face. The combined effect of the pressure and the suction gives good results, but I may use suction alone to remove the film of oil from the belt.

An electric motor is shown at 12 as the power unit for the plant and drives the pump 11 and (through speed reducing countershafts 13) the driven roller 6 for the belt, and also an air compressor 26. The air compressor 26 supplies air at high pressure through pipes 27 and valves 28 at different points into a suitable collecting pipe. The pressure of the air and the intervals at which it is admitted to the collecting pipe, will be adapted to the distance at which the carbureted air is to be used.

At Fig. 6 I have shown a section of the oil conveying pipes 20, and of the collecting pipe, in which a series of sleeves or cylinders 31 of gauze are arranged for affording a large surface on which any of the atomized oil which condenses during transit may collect as a film, but in a state of division, so that it may be taken up again by the action of the current of air within the pipe. Beyond the cylinders 31 before the mixture finally leaves the pipe is a fine-mesh diaphragm 30 occupying the whole bore of the pipe for a final division of oil. The sleeves 31 may be pleated gauze, or rings of gauze may be employed for the same purpose. The gauze should be removable for cleaning purposes and double pipes may be used if desired so that one set may be used while another is being cleaned.

For the openwork fabric belt 2 I prefer to employ a single layer of gauze, but should more than one layer be used, the layers should be carefully separated by such means as metal distance pieces at the sides and intervals in the belts, so that the capillary action may take place between the adjoining layers of gauze.

With the illustrated apparatus in use, the oil owing to its viscosity and by capillary attraction adheres to the meshes of the gauze belt 2 in the shape of a thin film that stretches over the meshes in an already divided state, and is carried by the belt as the latter travels. As the belt passes through the separating compartments 4 and 5, in which air is in constant circulation by means of a fan or other suitable means, in a direction parallel to the face of the belt, part of the air circulates over the belt, and part of the air under it so that both faces of the belt are subjected to the action of the air. In these separating compartments part of the water carried by the oil is evaporated, and part of it falls or drops from the belt by gravity owing to the absence of viscosity in the water. In order to intensify the segregation of the water and extraneous matter, I may impart to the moving belt, at one or other points, a vibratory motion in a direction at right angles with its path. The separated water falls to the bottom of the compartment, from whence it is drawn away by gravity with suitable precautions to prevent oil being drawn away with it.

Towards the end of the belt's travel, after passing through the separating compartments 4 and 5, the belt passes the atomizer and a funnel-shaped collector for the oil. The part of the funnel-shaped collector 19, that touches the under face of the belt in all its width is in the shape of a rectangle of suitable width and length and narrows down till it assumes a round section at its lowest points.

From this round section a suitable pipe carries away the oil to the furnace, boiler, etc., where it is used. Corresponding with the rectangular portion of the bottom collector is the top portion 18 for the said atomizer and collector. The opening of the top collector that abuts on the belt should be smaller than the opening of the corresponding bottom collector so that the current of air forced through the belt is surrounded by air at normal pressure as it passes from the top to the bottom half of the oil collector. Through the top portion 18 of the collector the air is introduced at a suitable pressure, and after traversing a diaphragm with suitable holes it meets the moving belt 2 at right angles, sweeping the films of oil downwards towards the lower portion 19 of the collector. During this process the oil is partly or completely atomized, and also mixed with air. The introduction of a further current of air before the oil reaches the burner in cases where it is necessary completes the process of evaporization of the oil and carburization of the air. In conveying the carbureted air from the collector to the place where it is utilized, it may, if required, pass through the gauze diaphragm, or sleeves 31 before described, in order to intensify the atomization of the oil.

The quantity of oil supplied to the burner, can be regulated by the speed of the moving belt.

If it is only required to separate the oil from water and uncombined substances, without atomizing the same, the blast introduced into the collector need not pass through the diaphragms or holes, and need only be of sufficient pressure to detach the films of oil from the gauze, and the gauze itself need not be as fine.

The cycle of operations represented by one complete revolution of the belt, may be completed by providing previous to the belt dipping again into the oil tank, mechanical means or currents of air or both for cleaning the belt from all the impurities that may have adhered to same.

In dealing with large quantities of oil, any number of units such as have been described, can be combined so as to be driven with one source of power and operated with one source of blast.

If the plant is to be in conjunction with a separate set of boilers, furnaces, etc., the dimensions of the said plant and the speed of the belt, will depend upon the corresponding consumption of oil. If desired, a mechanical governor can be employed to automatically regulate the oil feed by controlling the speed of the belt through any suitable mechanism.

I claim—

1. Apparatus for the separation and purification of oil comprising an oil container, an openwork fabric travelling in said container and dipping into the oil therein; the main portion of the travel of said fabric above the oil in said container being substantially horizontal to enable separation by gravity to be effected and means for passing air currents through said fabric to remove the film of oil therefrom.

2. Apparatus for the separation and purification of oil comprising an oil container, an open work fabric in said container with a part dipping in the oil therein, means for moving said fabric and for supporting same, said supporting means for the fabric being arranged so that the main portion of the travel is above the oil and substantially horizontal, a compartment in said container through which said fabric travels, and air currents circulated in said compartment so as to pass parallel with the surfaces of said fabric and in contact with same, and means for passing air currents through said fabric to remove the film of oil therefrom.

3. Apparatus for the separation and purification of oil comprising an oil container, an openwork fabric travelling in said container and dipping into the oil therein; the main portion of the travel of said fabric above the oil in said container being substantially horizontal to enable separation by gravity to be effected, and means for passing air currents through said fabric to remove the film of oil therefrom, said means comprising an air distributor against one surface of said fabric and a collector against the opposite surface of said fabric.

4. Apparatus for the separation and purification of oil comprising an oil container an openwork fabric travelling in said container and dipping into the oil therein; the main portion of the travel of said fabric above the oil in said container being substantially horizontal to enable separation by gravity to be effected, and means for passing air currents through said fabric to remove the film of oil therefrom, said means comprising an air distributor against one surface of said fabric and a collector against the opposite surface of said fabric, said collector having its mouth larger than said air distributor and converging to a pipe section.

5. Apparatus for purifying oil by separating it from water or like comprising an oil receptacle an endless openwork belt travelling substantially horizontally therein and dipping in the oil in the receptacle and means for passing air through the belt to remove the oil film therefrom.

6. Apparatus for purifying oil comprising an oil container, an endless belt of openwork fabric travelling therein, mainly in a substantially horizontal direction, a chamber in said container having compartments in inclined series and means to cause air to circulate therein, said belt passing said chamber and the air in said compartments being circulated so that adjacent to the belt its direction is parallel with the surface of the belt, and means for removing the film of oil from the belt.

7. Apparatus for purifying oil comprising an oil container, an endless belt of openwork fabric travelling therein, mainly in a substantially horizontal direction, a chamber in said container having compartments in inclined series and means to cause air to circulate therein, said belt passing said chamber and the air in said compartments being circulated so that adjacent to the belt its direction is parallel with the surface of the belt, and means for removing the film of oil from the belt, said means comprising an air distributor above the belt, and an oil collecting funnel below said belt and opposite said distributor.

8. Apparatus for purifying and atomizing oil comprising in combination an oil container, a fabric belt of endless form therein with a part dipping in the oil, means for driving said belt, separating chambers through which said belt passes and means to cause air to circulate in said chamber and so as to come in contact with the belt, an air distributor disposed above said belt so as to direct air currents through the fabric of said belt, and a collector for the atomized oil below said belt opposite said air distributor, said collector leading to converging pipes, means for introducing air to said pipes and a series of gauze members located in said pipes.

In testimony whereof I affix my signature.

LUIS WIRTZ.